United States Patent [19]

Anderberg

[11] 3,976,825

[45] Aug. 24, 1976

[54] LEAD-THROUGH FOR ELECTRIC CABLES AND THE LIKE

[76] Inventor: Hans Erik Anderberg, Rasundsvaren 72, 171 37 Solna, Sweden

[22] Filed: June 24, 1975

[21] Appl. No.: 589,668

Related U.S. Application Data

[63] Continuation of Ser. No. 432,090, Jan. 9, 1974, abandoned.

[30] Foreign Application Priority Data

Jan. 15, 1973 Sweden ............................. 7300523

[52] U.S. Cl. ................................. 174/151; 248/56
[51] Int. Cl.² ...................... H02G 3/22; F16L 5/02
[58] Field of Search ............... 174/48, 49, 135, 151; 29/428; 52/220; 248/56, 68 R, 68 CB; 285/192

[56] References Cited
UNITED STATES PATENTS

| | | | |
|---|---|---|---|
| 2,227,528 | 1/1941 | Adler | 174/135 |
| 2,732,226 | 1/1956 | Brattberg | 285/192 |
| 2,813,692 | 11/1957 | Bremer et al. | 248/56 |
| 3,282,544 | 11/1966 | Brattberg | 248/56 |

FOREIGN PATENTS OR APPLICATIONS

1,921,855   11/1969   Germany ............................. 52/220

Primary Examiner—Laramie E. Askin
Attorney, Agent, or Firm—Burns, Doane, Swecker & Mathis

[57] ABSTRACT

The invention comprises a lead-through for electric cables and the like which is fire-proof, gas-proof, and liquid-proof at a predetermined temperature. The cables extend through an opening in a ceiling, floor and/or wall. Guide strips encircle at least one conductor or cable; and filling members, when required, are placed between the sides of the opening and guide strips. The filling members and the strips comprise a material having a relatively high coefficient of cubic expansion. A support member for the strips is arranged to abut a support edge formed in a frame structure. The support member affords a reinforcement against high pressure acting on the lead-through.

14 Claims, 16 Drawing Figures

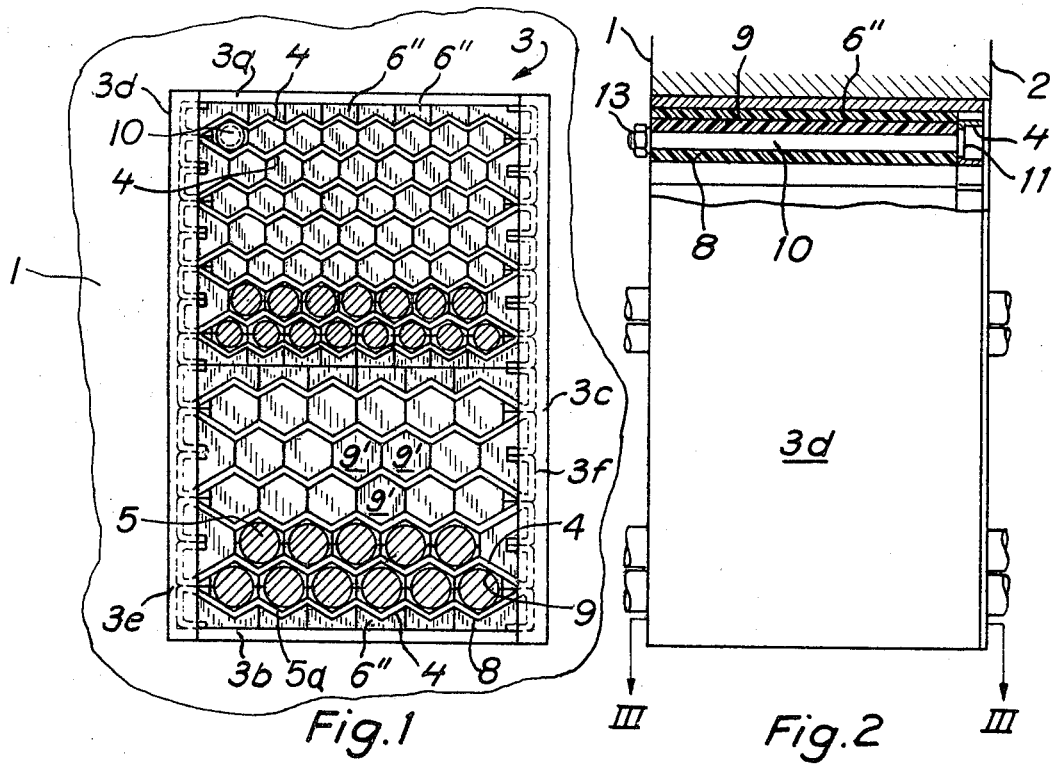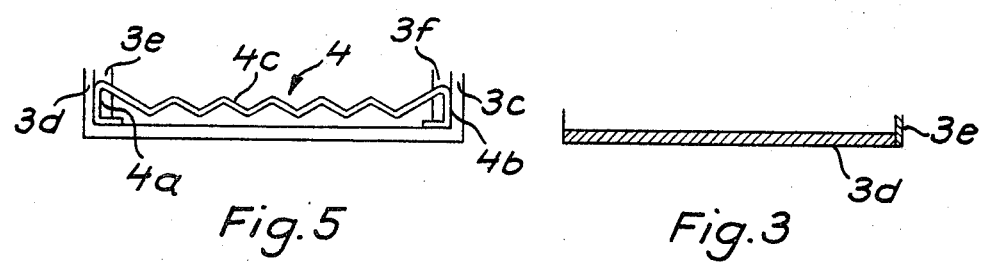

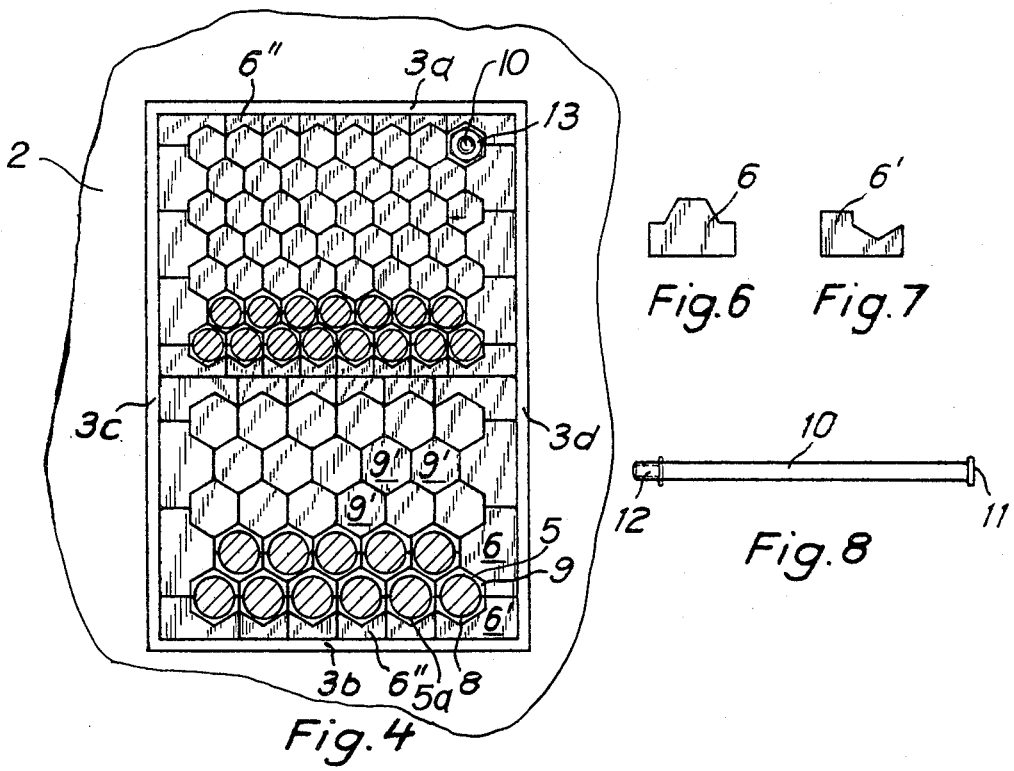
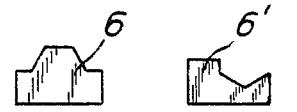
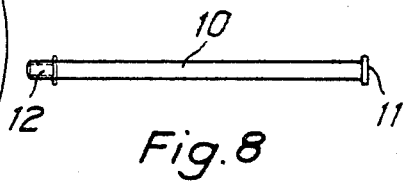
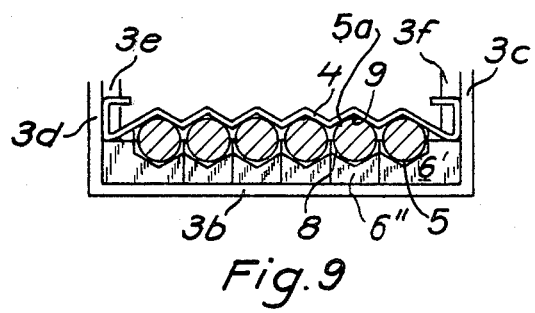

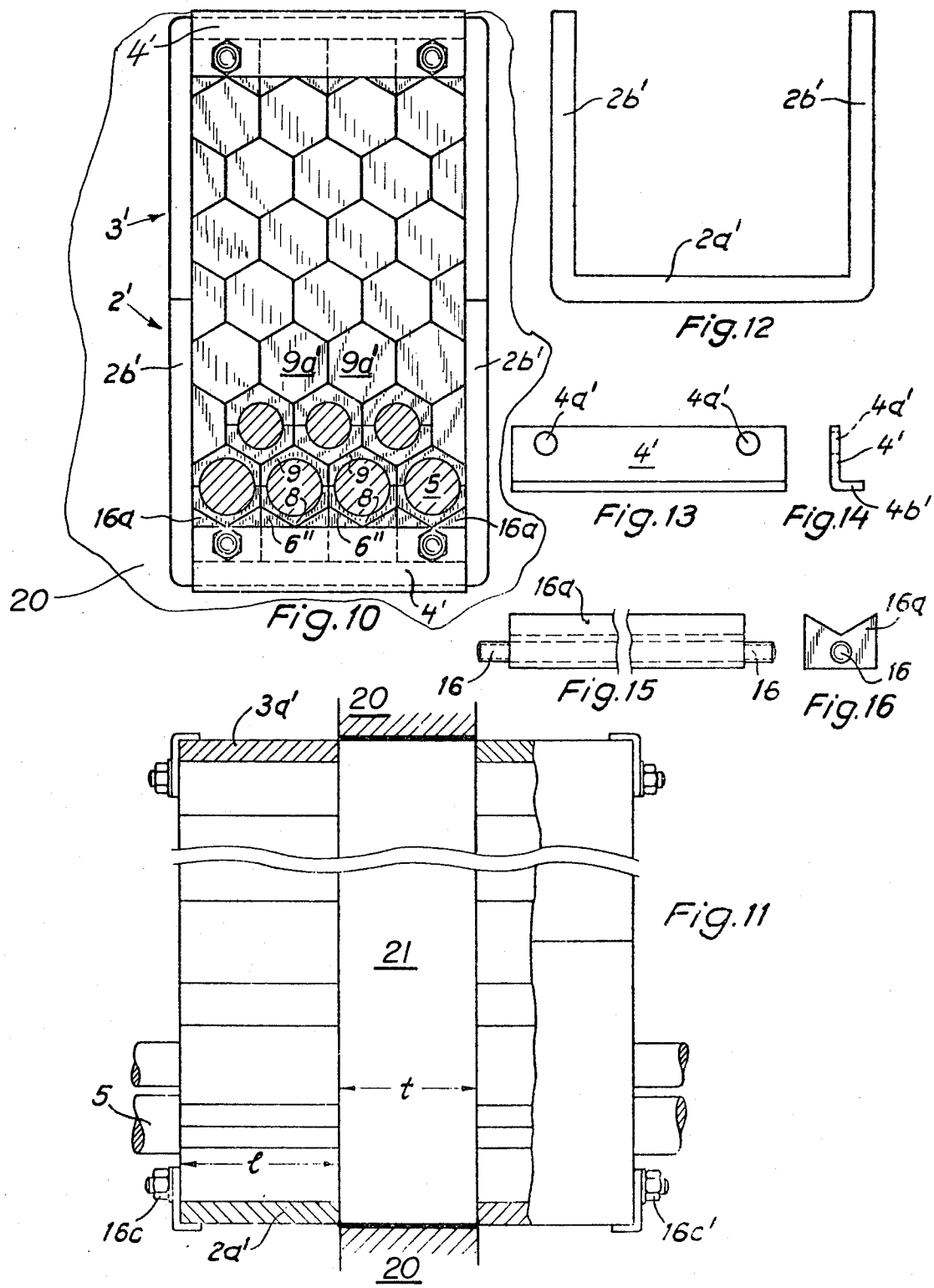

LEAD-THROUGH FOR ELECTRIC CABLES AND THE LIKE

This is a continuation of application Ser. No. 432,090, filed Jan. 9, 1974, now abandoned.

FIELD OF THE INVENTION

The present invention relates to a lead-through for cables, pipes or the like in ceilings, floors and/or walls, bulkheads and like structures.

BACKGROUND OF THE INVENTION

It is known to arrange in, for example a wall, a fire-proof lead-through for electric conductors by encasing respective conductors in an elastic member in a previously provided hole in the wall, the elastic member having the form of pairs of matching sections arranged to embrace respective conductors. Part of the opening for the elastic member and the conductors is left free to enable pressure exerting devices to be inserted in the hole, by means of which devices the elastic member can be pressed tightly against the portions of the conductors drawn through the lead-through. The elastic member should be capable of expanding extensively when subjected to high temperature, as for example, in the event of a fire.

The usefulness of such methods and devices for constructing a lead-through in the aforementioned manner is greatly limited, and said methods and devices give rise to a number of disadvantages of a technical and economic nature, as will be apparent from the following. For example, the known methods and devices can only be applied when a small number of conductors are to be passed through a building structure, such as a wall, and are less suitable for use with a large number of conductors. Thus, the known methods and devices are most unsuitable for lead-throughs in telephone exchanges for example, where it is necessary to provide fire-proof lead-throughs for cable bunches comprising several hundred cables. In such cases unreasonably high forces would have to be exerted on the elastic member in order to meet standard requirements with regard to the tightness with which adjacent cable portions are packed.

Furthermore, the pressure forces applied to the cables are distributed differently over different cables, whereby a number of the cables are subjected to forces of such magnitude as to cause risk of cross-talk between the conductors within the cables. The support afforded the cables by such a lead-through is also partly dependent on the ratio between the cross-section area of the opening and the depth (wall thickness) of the lead-through. As mentioned above, the construction of a lead-through is complicated when it is to receive a large number of cables and such construction would necessitate the use of auxiliary means.

OBJECTS OF THE PRESENT INVENTION

The object of the present invention is to provide a lead-through for receiving a large number of cables, which is technically simple to construct, and economically viable. The aforementioned pressure exerting means and the risk of cross-talk and aging are substantially eliminated by means of the present invention, which also makes it possible for the entire opening made in the wall, for example, to be used effectively. In addition cables can be changed and additional cables drawn through the lead-through without it being necessary to dismantle and re-build the same. The main object of the invention is to provide the possibility of constructing the lead-through from one side of a wall for example, which under certain conditions can be a necessary requisite. Further, the invention provides the possibility of building a pressure-proof lead-through, capable of withstanding forces caused by an explosion occurring in the vicinity thereof.

Another object of the invention is to reduce the thickness of walls, bulkheads and like structures intended to receive such lead-throughs, while making the same resistant to heat. It is a known fact that cables, pipes and the like must pass through such walls and for this purpose the walls are provided with special lead-throughs. The length of the lead-through normally corresponds to the thickness of the wall. This means that the lead-through has a length which is unsatisfactory from the point of view of fire resistance, since a fire will destroy the cable and lead-through more readily than the remainder of the wall. This means that fire can pass from one space to another through the cable lead-through It is therefore a further object of the invention to improve the cable lead-through by giving it the same fire-proof properties as the wall in general, while retaining the length of the lead-through, which normally coincides substantially with the thickness of the wall. Such a construction has proven very difficult to realize, and the present invention is based on the concept of constructing the lead-through so that its length is of such magnitude that a fire-proof lead-through is obtained which at least substantially equals the fire resistance of the wall. Accordingly, the lead-through of the present invention has a predetermined length, which greatly simplifies its manufacture since cable guide strips enclosed therein can be produced in exact lengths.

The invention relates to a method of constructing a cable lead-through in an opening in a ceiling, floor and/or wall or like structure, said lead-through being fire-proof, gas-proof and liquid proof at pre-determined temperatures. In assembling the lead-through guide strips are arranged around at least one cable and filling pieces are optionally placed between the sides of the opening and the guide strips, said filling pieces and/or guide strips comprising a material having a relatively large coefficient of cubical expansion. The cables drawn through the opening are placed at one outer end thereof in a determined position in the cross section of the opening by supporting said guide strips and/or said filling members with a member arranged in abutment with a support edge formed in a frame structure, and by displacing the guide strips and/or filling members from one and the same side to bear against the support member.

The invention also relates to a support member used in the method of constructing the lead-through which is arranged to support the guide strips and/or filling members and to engage a support edge formed on a frame, the guide strips and/or filling members being arranged to abut against said support means, which affords reinforcement against high pressures acting on the lead-through.

BRIEF DESCRIPTION OF THE DRAWINGS

The invention will now be described in more detail with reference to two preferred embodiments thereof illustrated in the accompanying drawings, further features of the invention being disclosed in conjunction therewith. In the drawings, FIG. 1 shows a lead-through extending through the ceiling or floor of a building structure, FIG. 2 shows a partial cross sectional elevation of the lead-through shown in FIG. 1, FIG. 3 shows a section taken through line III—III in FIG. 2, FIG. 4 is a bottom plan view of the lead-through shown in FIG. 1, FIG. 5 shows the positioning of means for supporting support strips and/or filling strips in a frame structure for the lead-through, FIG. 6 is a cross-sectional view of a first filling member, FIG. 7 is a cross-sectional view of a second filling member, FIG. 8 shows a bolt by means of which a filling member can be withdrawn from the lead-through, FIG. 9 shows the positioning of a second support means in the frame subsequent to the first support means having fulfilled its purpose, FIG. 10 is a front view of a second embodiment of a lead-through according to the invention, FIG. 11 is a side view, partly in section, of the lead-through shown in FIG. 10, FIG. 12 is a front view of one portion of a frame comprising two parts, FIG. 13 is a front view of a support rail, FIG. 14 is a side view of the support rail shown in FIG. 13, FIG. 15 is a side view of a bolt co-acting with a filling member, and FIG. 16 is an end view of the bolt and the filling member.

DESCRIPTION OF THE PREFERRED EMBODIMENT

FIG. 1 shows a lead-through which utilizes a four-sided sheet metal conduit intended to be placed in an opening made in a wall or like structure, the conduit being secured tightly in the wall by plastering, casting, welding techniques or by any other appropriate securing technique. With the illustrated embodiment of FIG. 1, the conduit is assumed to be placed in the floor 1 of a building structure, said floor 1 constituting the ceiling structure 2 (FIG. 4) of a room located beneath the room accommodating said floor.

The conduit 3 is comprised of four portions 3a, 3b, 3c and 3d. The conduit, which is seen in FIG. 1 from the outer end thereof and from beneath and, as also seen from FIG. 5, is provided on opposing long sides thereof with inwardly extending flanges 3e and 3f which, as will be further apparent from FIG. 5, have the effect of narrowing the lead-through. Abutting the flanges 3e and 3f are support members or retaining means 4 intended to co-act with cable support strips and/or filling members. The support members 4 can be seen from FIGS. 1 and 5 as having two end portions 4a and 4b which are intended to abut and rest upon the flanges 3e and 3f when introduced from the opposite side (i.e., from the left in FIG. 2). End portions 4a and 4b extend between the end portions in a wave-or V-shaped configuration, as shown at 4c. The distance between the wave-crests coincides with the distance between the centre points of adjacently lying cables 5 and 5a. The support member 4 is produced from iron strip and is bent to the shape shown in FIG. 5, said member having thereby been given a shape in which it is highly resistant to bending at right angles to the plane of the drawing, which means that the lead-through is capable of withstanding high pressures.

Although in FIGS. 1, 2 and 4, the support member 4 is shown placed on one side only of the lead-through, it will be readily perceived that the support members may also be placed on both sides of the lead-through. As seen in FIG. 1, a plurality of support members 4 can be pushed together to form recesses which correspond to or which slightly exceed the external size of the cables 5.

FIG. 4 shows the lead-through conduit in top plan view and from the side on which the worker stands when working on the lead-through. Although the lead-through is intended to accommodate a relatively large number of cables, only two, 5, 5a have been shown. Each cable, such as cable 5 for example, is encircled by two rigid guide strips or guide means 8 and 9 which are provided with smooth surfaces and which together form a cavity in which the cable 5 can be housed with a predetermined clearance between the cable and the strips. This clearance is applicable at normal temperatures, but not at high temperatures, such as those prevailing in the event of fire. With the illustrated embodiment, each strip 8 and 9 (FIG. 4) has a cross-sectional shape of a semi-hexagon, so that when the strips 8 and 9 are brought together they form a hexagon around the cable 5. The guide strips are designed so that when the conduit is inserted into the holes, the strips form hexagonal units arranged tightly adjacent each other without leaving any intermediate air space therebetween. When seen in the cross section of the conduit, the strips together form a honeycomb. Arranged between the four side edges of the conduit shell and the guide strips are filling members 6, 6' (FIGS. 6 and 7) and 6''. The filling members 6' and 6'' have two surfaces arranged at an angle of 120° to each other which coincides with two corresponding surfaces on the support member 4. Further filling members 6 are arranged at the two side walls of the conduit (FIG. 6). The cables, strips and filling members thus have corresponding cross sectional shapes so that they fill the entire lead-through. The lead-through can be designed to advantage so that a portion of the recesses formed by the guide strips in the conduit are left empty, whereby it is possible to readily pass cables through the lead-through without it being necessary to first remove the lead-through and then rebuilding it in the wall. For this purpose, plugs 9' having the same cross sectional shape as the guide strips 8 and 9 are placed in said recesses instead of cables. As can be seen from FIGS. 1 and 5, there is provided a plurality of adjacent bent strips 4 which are disposed to present to each other a series of opposed V-shaped openings, adjacent strips being spaced apart sufficiently to accommodate plugs or filling members 9' or guide strips 8 and 9. As already indicated, each of the filling members has a hexagonal cross section, with opposing pairs of sides of the cross section conforming to the configuration of the portion of the V-shaped openings of support or retaining means 4 adjacent the pairs of sides.

The aforedescribed construction of the lead-through according to the invention prevents air drafts at normal temperatures, provided that the aforementioned predetermined clearance between the pairs of guide strips and the cables is not too great. At the same time, however, a relatively large clearance contributes to facilitating the construction of the lead-through. Further, it is important that the guide strips and filling members are sufficiently rigid to enable the resistance to friction to be readily overcome when said strips and members are inserted into the conduit. The aforementioned pre-determined clearance can also be arranged in accordance with the invention so that said clearance is only present along a portion of the strips in the longitudinal direction of the lead-through. An important advantage is thereby obtained even though said strips and members are produced to accurate measurements and shape and have smooth and polished surfaces. Similarly, it is to advantage if the cross-sectional size of the strips and members can be kept small, as with the illustrated embodiment.

Guide strips and filling members having the requisite smooth and polished surfaces and good accuracy with respect to shape and size can be obtained by extruding the same out of a plastic material. The strips and filling members can be extruded in indefinite lengths, but should be delivered to the working site in cut lengths adapted to the lead-through being installed. The plastic material selected for the guide strips and filling members should have a relatively high coefficient of cubical expansion, so that it expands extensively when subjected to heat. Further, the plastic material selected should be a poor conductor of heat and should be difficult to ignite.

FIG. 2 shows the assumed thickness of the support member 4 in the longitudinal direction of the lead-through and also shows that the support member is intended to extend along the bordering surface of adjacently located guide strips 8, 9 and/or filling members 9' or filling members 6, 6'. The thickness of the support member 4 should be selected according to the desired pressure safety.

When the whole of the lead-through is filled, difficulty may be experienced in removing plugs 9' when desiring to pass additional cables or the like through the lead-through. To facilitate removal of the plugs, a bolt 10 is positioned between two guide strips 8, 9. The bolt 10 has a flange 11 placed between support members 4 and abutting guide strips 8, 9. The bolt 10 may be secured to the guide strips by means of an adhesive or by any other appropriate means. The bolt has a threaded portion 12 which is arranged to co-act with a nut 13 extending beyond the lead-through. In this way, the bolt 10 and the guide strips 8, 9 can be withdrawn from the lead-through by pulling on nut 13 toward the left, as shown, for example in FIG. 2 to remove members 8 and 9 and expose a space for a new cable. Subsequent to removing the bolt, additional adjacently located filling members can be removed. With the embodiment shown in FIG. 9, an additional filling member 6' is used.

It has been found that the distance between the apex of the angle of the filling member 6'' and the frame 3b should be one quarter of the distance between diametrically opposed angle apexes of guide strips 8, 9.

FIG. 10 illustrates a second embodiment of a lead-through according to the invention, which comprises a four-sided frame intended to be mounted in an opening made in a wall or like structure, the frame being secured to the wall by means of plastering, casting, welding techniques etc.

The lead-through illustrated in FIG. 10 is intended to accommodate cables, tubes or the like in a wall, bulkhead, or like structure. The wall, for instance, may have been previously provided with a frame for another lead-through or may have been previously provided with a hole. The embodiment of FIG. 10 is based on the concept that the lead-through itself should have a longitudinal dimension which exceeds, preferably considerably exceeds, the thickness of the wall. The previously described support member 4 can also be used to advantage in the embodiment of FIG. 10 and is assumed to be located to the right of FIG. 11. The member 4 is not shown in FIGS. 10 – 16. In FIG. 11, the wall is identified by the reference 20 and the thickness of the wall is shown by the reference "$t$". To enable the longitudinal dimension of the lead-through to be increased, there is placed a separate frame on the outside of the wall 20. As will be seen from FIG. 11, two separate frames are placed on their respective sides of the wall 20. The wall, as previously mentioned, is provided with a hole through which cables, pipes or the like can pass. When the structure through which the cables, pipes or the like are to pass has the form of a bulkhead, the wall suitably comprises a welded frame on which is arranged a flange which can be welded to the bulkhead. The flange should have a size which exceeds that of the hole arranged in the bulkhead, said hole normally being of oval configuration. The hole arranged in the structure through which the cable, piping etc. is to pass may also suitably have the form of a frame structure in other fields of application.

As will be seen from the drawing, a separate frame, 2',3' is placed adjacent the wall 20. The frame with the illustrated embodiment comprises two U-shaped parts 2',3'. Since the parts 2' and 3' are identical, only part 2' will be described hereinafter. The frame portion 2' comprises a bottom portion 2a' and two legs 2b'. The frame portion 2' has a length "l" adjusted to the prevailing conditions with regard to the resistance of the lead-through to fire. An increase in length "l" provides an increase in the resistance to fire.

The frame portions 2' and 3' are held relative to the wall 20 by a frame 21 and by means of a bolt joint and a support bar 4'. The support bar 4' is provided with two hole 4a' through which the bolt is intended to extend. The support bar 4' also has an angular portion 4b' which is arranged to extend beneath the frame portion 2' to retain said frame in its intended position relative the wall 20.

The bolt joint comprises an elongated bolt 16 which is inserted through a filling member 16a. The bolt 16 is intended to extend beyond the filling member 16a. The filling member 16a has a length which corresponds to the length "l" of the frame or twice the length "l" of the frames and the thickness "$t$" of the wall.

As will be seen from the drawing, the frame portions 2' and 3' are placed adjacent a hole arranged in the wall 20. The bolt 16 with the filling member 16a is placed so that it extends through the hole and the wall 20 and abuts the bottom portion 2a' of the frame portion 2'. The support bar 4' is then placed so that the hole 4a' co-acts with the bolt 16. Additional filling members 6'' are placed against the lower portion of the frame portion 2a'. A nut 16c is then screwed onto the bolt 16 to retain the frame portion 2' to the wall 20. An opposing nut 16c' is applied to the other end of the bolt 16. The frame 2' is secured to the wall 20 by means of the bolt joint and the support bar 4'. The upper frame portion 3' is secured in a similar manner. When the frame portions are secured in place, filling members and guide strips 8 and 9 for cables, pipes or the like are placed in position so that there is formed therearound a satisfactory seal. Filling members 9a' are placed so that the hole of the lead-through is sealed off.

The invention is not restricted to the disclosed and described embodiments but can be modified within the scope of the following claims. Thus, the elongated bolt 16 may be cast in the filling member. Further, the two U-shaped portions are conveniently made of a refractory material having low heat conductivity.

As previously mentioned, one object of the invention is to provide a lead-through which substantially prevents gas from passing therethrough at low temperatures, for example in the region of 50°C or less. This object is achieved by coating the end surfaces of guide strips facing in the same direction with a layer of material, which, among other things, will seal the space between guide strips and cables to form a lead-through which is substantially gas tight at low temperatures. The substance used to coat said end surfaces may be "Fire Protective Subliming Thermolag Coating 330-1" or a film of plastic material. The layer can either be sprayed or brushed onto one side and/or the other side of said guide strips to seal possible openings. It is most suitable, however, to apply the coating to liquid-proof left side of the lead-through as shown in FIGS. 2 and 11.

Further, the lead-through conduit may comprise two halves which partially overlap and which can be displaced relative to one another, to enable the conduit to be adapted to walls and the like of different thickness.

I claim:

1. A lead-through, for conducting electrical cables and the like through an opening in a wall or ceiling said lead-through being fire-proof, gas-proof, and liquid-proof at a predetermined temperature, comprising:
   a frame structure for bounding an opening in a wall or ceiling;
   inwardly extending flanges on two opposing sides of the frame structure narrowing the opening of said frame structure;
   a plurality of guide means within said frame structure forming a plurality of spaces for cables to be passed through said opening, said guide means individually encircling each of one or more cables when said cables extend through said frame structure, said guide means being composed of a material having a relatively high coefficient of cubic expansion, whereby in the event of fire, said guide means will expand and form tight seals around the cables and against each other to prevent transfer of flame and combustion gases through said lead-through;
   a plurality of filling members extending between the sides of said frame structure and said guide means, said filling members being composed of a material having a relatively high coefficient of cubic expansion, whereby, in the event of fire, said filling members will expand and form tight seals against said guide means, against said frame structure and against each other to prevent transfer of flame and combustion gases through said lead-through; and
   retaining means for retaining said guide means and said filling members within the confines of said frame structure, said retaining means arranged to abut and rest upon said flanges of said frame structure adjacent a first outer end of said opening, said guide means and said filling members abutting said retaining means.

2. A lead-through as defined in claim 1 further comprising a plurality of rigid plug means of a material having a relatively high coefficient of cubic expansion but low heat conductivity placed in and closing such spaces not occupied by guide means, said plug means, in the event of fire, expanding to form tight seals against each other to prevent transfer of flame, combustion gases, and heat through said lead-through.

3. A lead-through as defined in claim 2 wherein a bolt extends through a guide means for removing the rigid plug means.

4. A lead-through as defined in claim 1 further comprising additional retaining means abutting the frame structure adjacent a second outer end of said opening from which said guide means and said filling members are inserted into said frame structure.

5. A lead-through as defined in claim 1 wherein said framestructure comprises two partially overlapping halves movable in relation to each other in the direction of said overlap to enlarge said frame structure prior to said structure being fixed adjacent the opening.

6. A lead-through as defined in claim 1 wherein said retaining means comprise a plurality of adjacent bent strips disposed to present to each other a series of opposed V-shaped openings, adjacent strips being spaced apart sufficiently to accommodate said filling members,
   each of said filling members having a hexagonal cross-section, opposing pairs of sides of said cross-section conforming to the configuration of the portion of said V-shaped openings of said retaining means adjacent thereto.

7. A lead-through as defined in claim 1 wherein said guide means comprise an electrically insulating material having a high coefficient of cubic expansion, whereby, in the event of fire, said guide means will expand and form tight seals around the cables and against each other to prevent transfer of flame and combustion gases through said lead-through.

8. A lead-through as defined in claim 1 including cables extending through said guide means wherein one side of the lead-through has a sealing layer to seal said lead-through against the entrance of gas at low temperatures.

9. A lead-through as defined in claim 8 wherein said sealing layer is comprised of a fire-proof material.

10. A lead-through as defined in claim 1 mounted in a wall wherein
    the wall through which cables are to be conducted comprises a bulkhead of a ship;
    the longitudinal dimension of said lead-through exceeds the thickness of the bulkhead;
    the frame structure is placed adjacent said bulkhead; and
    said frame structure is held in sealing engagement with said bulkhead.

11. A lead-through in combination with a bulkhead as defined in claim 10 wherein said frame structure is comprised of two abutting portions, each of said portions being of U-shaped cross-section.

12. A lead-through in combination with a bulkhead as defined in claim 10 wherein said frame structure further comprises a first separate frame structure placed on one side of said bulkhead and a second separate frame structure placed on the opposed side of said bulkhead.

13. A lead-through in combination with a bulkhead as defined in claim 10 wherein the frame structure is held in sealing engagement with the bulkhead by means which comprise
    a support bar embracing said frame structure, and
    a plurality of bolts passing through said support bar.

14. A lead-through in combination with a bulkhead as defined in claim 10 wherein said frame structure is composed of a refractory material.

* * * * *